United States Patent
Rydberg et al.

(10) Patent No.: US 9,862,473 B2
(45) Date of Patent: Jan. 9, 2018

(54) METHOD FOR CONTROLLING A BOAT COMPRISING A PIVOTABLE DRIVE UNIT, AND A ELECTRONIC VESSEL CONTROL UNIT FOR STEERING A BOAT

(71) Applicant: AB VOLVO PENTA, Göteborg (SE)

(72) Inventors: Anders Rydberg, Arboga (SE); Johan Wiklund, Köping (SE)

(73) Assignee: AB Volvo Penta, Göteborg (SE)

( * ) Notice: Subject to any disclaimer, the term of this patent is extended or adjusted under 35 U.S.C. 154(b) by 64 days.

(21) Appl. No.: 15/037,087

(22) PCT Filed: Nov. 18, 2013

(86) PCT No.: PCT/SE2013/000177
§ 371 (c)(1),
(2) Date: May 17, 2016

(87) PCT Pub. No.: WO2015/072895
PCT Pub. Date: May 21, 2015

(65) Prior Publication Data
US 2016/0288893 A1 Oct. 6, 2016

(51) Int. Cl.
*B63H 25/42* (2006.01)
*B63B 39/00* (2006.01)
(Continued)

(52) U.S. Cl.
CPC ............ *B63H 25/42* (2013.01); *B63B 39/00* (2013.01); *B63B 39/14* (2013.01); *B63H 5/125* (2013.01);
(Continued)

(58) Field of Classification Search
CPC B63H 25/42; B63H 5/125; B63H 2005/1254; B63H 2025/022;
(Continued)

(56) References Cited

U.S. PATENT DOCUMENTS 1,731,236 A 10/1929 Dow
1,774,825 A 9/1930 Dow
(Continued)

FOREIGN PATENT DOCUMENTS

WO 2008030149 A1 3/2008
WO 2013039445 A1 3/2013

OTHER PUBLICATIONS

European Official Action (dated Jul. 10, 2017) for corresponding European App. EP13897325.0.
International Search Report (dated Aug. 15, 2014) for corresponding International App. PCT/SE2013/000177.

*Primary Examiner* — Mary D Cheung
(74) *Attorney, Agent, or Firm* — WRB-IP LLP (57) ABSTRACT

A method is provided for controlling a boat. The boat is adapted to float in a body of water. The boat includes a hull having a longitudinal extension along a hull longitudinal axis, a lateral extension along a hull lateral axis and a vertical extension along a hull vertical axis. The boat also includes a set of drive units, the set of drive units comprising at least one drive unit. Each drive unit in the set is arranged such that it, during driving of the boat, is adapted to be at least partially submerged into the body of water; adapted to be pivotable, relative to the hull, around a drive unit longitudinal axis that is substantially parallel to the hull longitudinal axis such that a drive unit roll angle can be varied, and adapted to be pivotable, relative to the hull, around a steering axis that forms an angle with the drive unit longitudinal, axis such that a drive unit steering angle can be varied.

7 Claims, 9 Drawing Sheets

(51) Int. Cl.
*B63H 5/125* (2006.01)
*G05D 1/08* (2006.01)
*B63B 39/14* (2006.01)
*B63B 39/08* (2006.01)
*B63H 21/14* (2006.01)
*B63H 25/02* (2006.01)

(52) U.S. Cl.
CPC .............. *G05D 1/0875* (2013.01); *B63B 39/08* (2013.01); *B63H 21/14* (2013.01); *B63H 25/02* (2013.01); *B63H 2005/1254* (2013.01); *B63H 2025/022* (2013.01); *B63H 2025/026* (2013.01); *B63H 2025/425* (2013.01)

(58) Field of Classification Search
CPC .............. B63H 2025/425; B63H 21/14; B63H 2025/026; B63H 25/02; B63B 39/14; B63B 39/00; B63B 39/08; G05D 1/0875
See application file for complete search history.

(56) References Cited

U.S. PATENT DOCUMENTS

| | | | |
|---|---|---|---|
| 2,213,611 A | | 9/1940 | Adolph |
| 3,136,283 A | | 6/1964 | McCormick |
| 4,582,013 A | * | 4/1986 | Holland, Jr. ............. B63H 9/02 114/39.3 |
| 4,863,404 A | * | 9/1989 | Salo ...................... B63L 339/08 114/122 |
| 6,026,759 A | * | 2/2000 | Hazelett ................ B63B 39/06 114/126 |
| 9,274,528 B2 | * | 3/2016 | Wilson ................. G05D 1/0875 |
| 2002/0174818 A1 | | 11/2002 | Von Wolske |
| 2006/0079140 A1 | | 4/2006 | Muller |
| 2007/0276663 A1 | | 11/2007 | Kaji |
| 2011/0048306 A1 | * | 3/2011 | Zvenyhorodskyy ....................... B63L 339/06 114/39.24 |

\* cited by examiner

METHOD FOR CONTROLLING A BOAT COMPRISING A PIVOTABLE DRIVE UNIT, AND A ELECTRONIC VESSEL CONTROL UNIT FOR STEERING A BOAT

BACKGROUND AND SUMMARY

The present disclosure relates to a method for controlling a boat. Moreover, the present disclosure relates to an electronic vessel control unit for steering a boat.

Many types of boats of today are furnished with a propulsion arrangement that includes an engine, such as an internal combustion engine, and one or more drive unit each one of which is equipped with a propeller.

The drive may be attached to the bottom or the stern of the boat. The drive unit may be pivotable around a steering axis such that the direction of travel of the boat may be altered.

For the safety and/or comfort of the occupants of a boat, it is generally desired that the inclinations, e.g. the roll and the trim, of the boat are kept within preferred ranges during the driving of the boat.

The inclinations obtained whilst driving the boat may depend on at least one of the following parameters: the speed of the boat, the steering angle of the boat and the shape of the hull.

As such, a system that is adapted to ensure that inclinations of the boat are within appropriate inclination ranges may generally have to be adjusted to the specific type of the boat, e.g. to specific characteristics of the hull and/or specific characteristics of the propulsion system of the boat. This in turn may result in a cumbersome design procedure and/or manufacturing procedure.

It is desirable to provide a method for dynamically controlling the inclination in at least one direction of a boat.

As such, an aspect of the present disclosure relates to a method for controlling a boat. The boat is adapted to float in a body of water. Moreover, the boat comprises a hull having a longitudinal extension along a hull longitudinal axis, a lateral extension along a hull lateral axis and a vertical extension along a hull vertical axis. The boat also comprises a set of drive units. The set of drive units comprising at least one drive unit. Each drive unit in the set is arranged such that it, during driving of the boat, is:

adapted to be at least partially submerged into the body of water;
adapted to be pivotable, relative to the hull, around a drive unit longitudinal axis that is substantially parallel to the hull longitudinal axis such that a drive unit roll angle can be varied, and
adapted to be pivotable, relative to the hull, around a steering axis that forms an angle with the drive unit longitudinal axis such that a drive unit steering angle can be varied.

The method comprises:
establishing a boat roll threshold value;
determining a target boat roll angle, and
positioning each drive unit in the set of drive units such that it assumes a drive unit steering angle and a drive unit roll angle such that a resulting boat roll angle is obtained, the absolute value of the difference between the resulting boat roll angle and the target boat roll angle being smaller than the boat roll threshold value.

Thus, with a control method according to the above, the boat roll angle may be controlled by virtue of the fact that the each drive unit is pivotable around two axes of rotation, viz the drive unit longitudinal axis and the steering axis. This implies that the control method may be used for any boat that has one or more drive units that are adapted to be pivoted around the above two axes of rotation. This in turn implies a reduced need for modifying the hardware of the boat, such as the shape of the hull or the type of propulsion system, in order to obtain appropriate roll characteristics doting operation.

Furthermore, the method according to the above implies that the control method may be adjustable to different driving conditions and/or different environmental conditions.

Optionally, the method further comprises:
establishing a boat direction threshold value;
determining a target boat direction of travel, and
positioning each drive unit in the set of drive units such that it assumes a drive unit steering angle and a drive unit roll angle such that a resulting boat direction of travel is also obtained, the absolute value of the difference between the resulting boat direction of travel and the target boat direction of travel being smaller than a the boat direction threshold value.

As such, in the above alternative of the control method, the boat roll angle and the boat direction of travel may be controlled simultaneously by pivoting each one of the drive units around the above two axis.

Optionally, the method further comprises:
determining the speed of the boat, and
determining the target roll angle based on the target direction of travel as well as the speed of the boat.

The fact that the target roll angle is based on the target direction of travel as well as the speed of the boat implies that there is an appropriately low risk that the boat will capsize, even if the boat makes a sharp turn at a high speed.

Optionally, the target roll angle is determined using a roll angle control model that uses input comprising the following parameters: the direction of travel, the speed and selected driving characteristics. Thus, an operator of a boat may be able to select the roll level on the basis of the operator's preferences.

Optionally, the set of drive units comprises at least two drive units. The method further comprises:
establishing a boat trim angle threshold value;
determining a target boat trim angle, and
positioning each drive unit in the set of drive units such that it assumes a drive unit steering angle and a drive unit roll angle such that a resulting trim angle is obtained, the absolute value of the difference between the resulting trim angle and the target boat trim angle being smaller than the boat trim angle threshold value.

The above alternative of the control method according to the present disclosure implies that the trim of the boat may be controlled even if one or more of the two drive units is mounted to the stem of the boat. This in turn implies increased possibilities to control the behavior of the boat.

Optionally, the boat may comprise a steering actuator. The target boat direction of travel may be determined by determining the position of the steering actuator.

A second aspect of the present disclosure relates to an electronic vessel control unit for steering a boat. The boat is adapted to float in a body of water. The boat comprises a hull having a longitudinal extension along a hull longitudinal axis, a lateral extension along a hull lateral axis and a vertical extension along a hull vertical axis. The boat also comprises a set of drive units. The set of drive units comprises at least one drive unit. Each drive unit in the set is arranged such that it, during driving of the boat, is:
adapted to be at least partially submerged into the body of water;

adapted to be pivotable, relative to the hull, around a drive unit longitudinal axis that is substantially parallel to the hull longitudinal axis such that a drive unit roll angle can be varied, and adapted to be pivotable, relative to the hull, around a steering axis that forms an angle with the drive unit longitudinal axis such that a drive unit steering angle can be varied.

The electronic vessel control unit is adapted to:

establish a boat roll threshold value;

determine a target boat roll angle, and issue a control signal to each drive unit in the set of drive units, the control signal being indicative of a drive unit steering angle and a drive unit roll angle such that a resulting boat roll angle is obtained, the absolute value of the difference between the resulting, boat roll angle and the target boat roll angle being smaller than the boat roll threshold value.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

The invention will below be described in relation to a boat 10 such as the pleasure boat illustrated in FIG. 1. However, it should be noted that the expression "boat" encompasses any type of aquatic vessel, such as a yacht or ship.

The boat 10 is adapted to float in a body of water 12. The body of water has as still water level 14. The boat comprises a hull 16 having a longitudinal extension along a hull longitudinal axis L, a lateral extension along a hull lateral axis T and a vertical extension along a hull vertical axis V.

Moreover, the boat 10 comprises a set 18 of drive units. The set of drive units comprises at least one drive unit. In the implementation of the boat 10 illustrated in FIG. 1, the drive unit set 18 comprises two drive units, viz a first drive unit 20 and a second drive unit 22.

Each drive unit 20, 22 in the set 18 is arranged such that it, during driving of the boat 18, is adapted to be at least partially submerged into the body of water 12. Moreover, each one of the drive units 20, 22 in the set 18 is adapted to be pivotable, relative to the hull 16, around a drive unit longitudinal axis 20', 22' that is substantially parallel to the hull longitudinal axis L such that a drive unit roll angle can be varied.

Each one of the drive units 20, 22 comprises a propeller assembly 21, 23 each one of which comprising one of more propellers. Each one of the propeller assemblies 21, 23 are adapted to provide a propeller thrust along a propeller axes.

The boat 10 generally comprises an engine 24, such as an internal combustion engine, which in turn is mechanically connected to the drive unit set 18 via a transmission shaft 26. Purely by way of example, each one of the drive unit longitudinal axis 20', 22' may extend in a direction that is substantially parallel to the extension of the transmission shaft 26.

However, it is also envisaged that each one of the drive units 20, 22 may be an outboard engine. As such each one of the drive units may comprise an individual engine (not shown) that is dedicated to drive one drive unit. Moreover, it is also envisaged that as boat may comprise a combination of at least one drive unit that is connected to an internal engine as well as at least one outboard engine.

Moreover, each one of the drive units 20, 22 in the set 18 is adapted to be pivotable, relative to the hull 16, around a steering axis 20", 22" that forms an angle with the drive unit longitudinal axis 20', 22' such that a drive unit steering angle can be varied. The drive unit steering angle will correspond to the direction of the propeller axis of the relevant propeller assembly. Preferably, the drive unit steering angle can be varied individually for each one of the drive units 20, 22.

Figure 1:
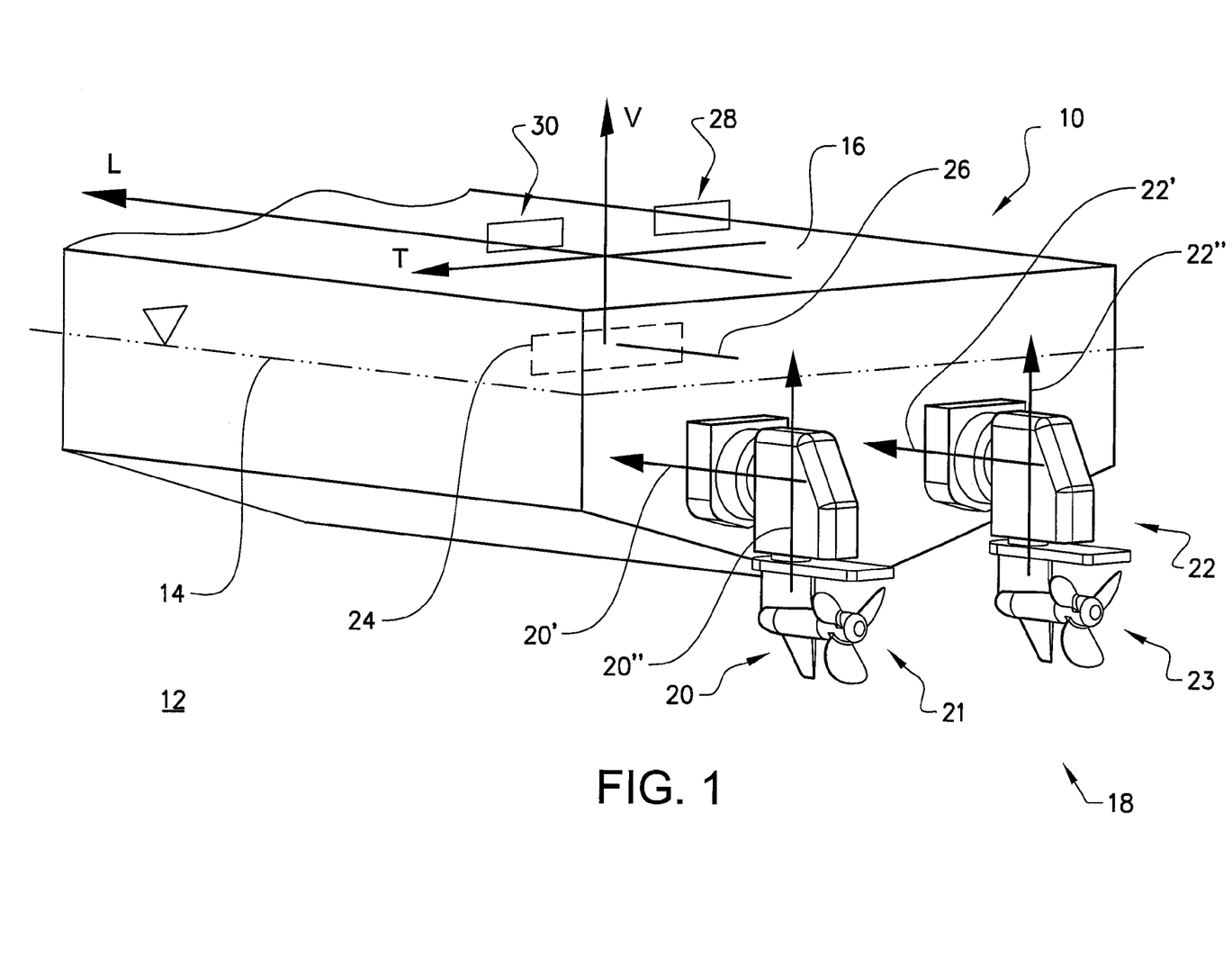
FIG. 1 illustrates boat furnished with a set of drive units.

FIG. 1 further illustrates an embodiment of an electronic vessel control unit 28 for steering the boat 10. The electronic vessel control unit 28 is adapted to implement method steps for controlling the boat 10.

Moreover, FIG. 1 illustrates that the boat may comprise a steering actuator 30 for steering the boat. Purely by way of example, the steering actuator 30 may comprise a steering wheel and/or a joystick.

Purely by way of example, the steering actuator 30 may adapted to be in communication, for instance mechanically and/or via electronic means, with the electronic vessel control unit 28.

Figure 2:
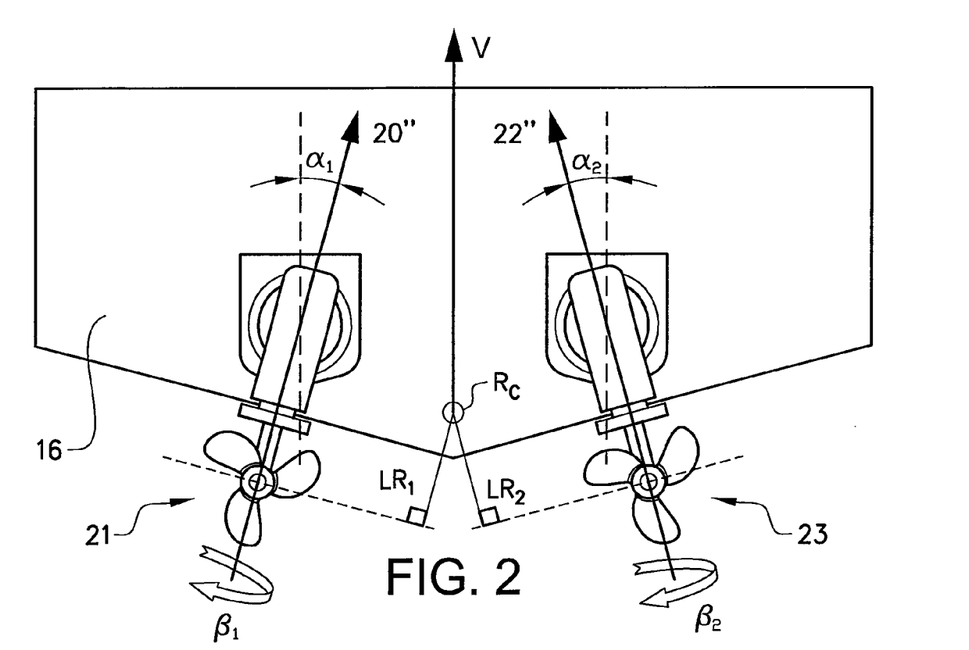
FIG. 2 illustrates a rear view of the FIG. 1 boat in a first operation condition.

FIG. 2 illustrates the FIG. 1 boat 10 in a condition in which each one of the drive units 20, 22 in the set 18 assumes a non-zero drive unit roll angle $\sigma\hat{}$, $\alpha 2$. As such, for each one of the drive units 20, 22, its steering axis 20", 22" forms an angle with the hull vertical axis V.

Generally, and as is indicated in FIG. 2, a drive unit roll angle a $a2$ for a drive unit 20, 22 may be considered to be positive when the drive unit is pivoted such that its propeller assembly 21, 23 is located further away from the hull vertical axis V than when the drive unit 20, 22 has a zero drive unit roll angle.

Additionally, FIG. 2 illustrates the FIG. 1 boat 10 in a condition in which each one of the drive units 20, 22 in the set 18 assumes a non-zero drive unit steering angle β1, β2. As such each one of the drive units 20, 22 is in the FIG. 2 condition pivoted around its steering axis 20", 22". As used herein, a zero steering angle is indicative of that the drive unit provides a thrust in a direction that is parallel to the hull longitudinal axis L.

Moreover, FIG. 2 illustrates the roll centre Rc of the boat 10. The roll centre Rc is the axis around which the boat 10 will roll when subjected to a roll moment. Moreover, if a drive unit 20, 22 assumes a condition in which it provides a thrust in a propeller axis that is non-parallel to the hull longitudinal axis L, that drive unit 20, 22 will provide a thrust component that is perpendicular to the hull longitudinal axis L. Such a thrust component will extend in the plane of the paper of FIG. 2.

The above discussed thrust component will impart a torque moment to the boat 10 and the roll lever for the thrust component is the perpendicular distance between a line extending in the direction of the thrust component and the roll centre Rc. FIG. 2 illustrates a first roll lever LR1 for the first drive unit 20 and a second roll lever LR2 for the second drive unit 22.

For each one of the drive units 20, 22, the magnitude and direction of the thrust component as well as the magnitude of the roll lever will result in a roll moment. If the sum of the roll moments from the drive units 20, 22 is non-zero, the boat 10 will be imparted a roll moment around the roll centre Rc. When the boat 10 is imparted a roll moment, the boat roll angle aB will change.

Figure 3:
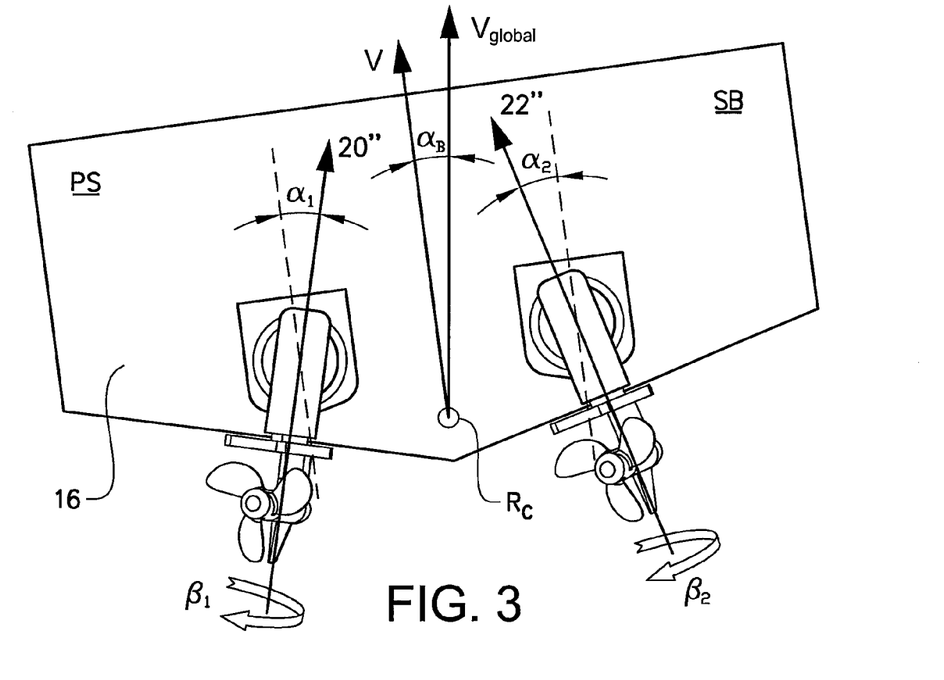
FIG. 3 illustrates a rear view of the FIG. 1 boat in a second operation condition.

FIG. 3 illustrates the FIG. 1 boat 10 in a condition in which the boat roll angle aB is nonzero. As such, the hull vertical axis V forms an axis with the global vertical axis Vglobal due to a rotation of the hull around the roll centre Rc. Thus, as used herein, the expression "boat roll angle" relates to the inclination of the boat 10 around the roll centre Rc.

Generally, the boat roll angle $\alpha B$ is considered to be zero when the boat 10 floats at even keel. Moreover, the boat roll angle $\alpha B$ is considered to be negative when the boat is in a condition such as the one indicated in FIG. 3, i.e. with the portside portion PS of the hull 16 being located at a lower level than the starboard portion SB of the hull 16.

The electronic vessel control unit 28 is adapted to determine a target boat roll angle αB,target—Purely by way of example, the target boat roll angle αB,target may be determined on the basis on input from an operator of the boat 10.

Instead of, or in addition to, determining the target boat roll angle αB target on the basis of the operator input, the target boat roll angle αB,target may be determined on the basis of the speed of the boat 10. The target roll angle aBitarget may then be determined on the basis of the target direction of travel as well as the speed of the boat. As a non-limiting example, the target roll angle aBitarget is determined using a roll angle control model that uses input comprising the following parameters: the direction of travel, the speed and selected driving characteristics.

Purely by way of example, the driving characteristics may be selected by the operator. As a non-limiting example, the driving characteristics may comprise one or more driving characteristics levels such as "comfort" or "sport". Purely by way of example, the "comfort" driving characteristics level may be associated with lower roll angles as compared to the roll angles associated with the "sport" driving characteristics level.

Furthermore, the electronic vessel control unit 28 is adapted to issue a control signal to each drive unit 20, 22 in the set 18 of drive units.

The control signal is indicative of a drive unit roll angle and possibly also a drive unit steering angle such that a resulting boat roll angle αB,result is obtained. The absolute value of the difference between the resulting boat roll angle αB,result and the target boat roll angle αB,target is smaller than the boat roll threshold value αBithreshold.

In order to alter the boat roll angle aB, the drive unit roll angle and possibly also a drive unit steering angle of at least one drive unit may be changed. If the drive unit roll angle of only one drive unit is to be changed, it may be preferred to select the drive unit for which the resulting drive unit roll angle corresponds to the largest distance from the propeller assembly to the still water level 14. For instance, in the FIG. 3 example, if choosing between decreasing the drive unit roll angle of the first drive unit 20 or increasing the drive unit roll angle a2 of the first drive unit 22, it may be preferred to decrease the drive unit roll angle α1 of the first drive unit 20 since the propeller assembly of the first drive unit 20 would then be located at a lower draught than what would have been the case if the drive unit roll angle a2 of the second drive unit 22 instead was to be increased.

To this end, the electronic vessel control in 28 is adapted to establish a boat roll threshold value αB,threshold.

The boat roll threshold value αB,threshold is indicative of the precision of the control of the boat roll. Purely by way of example, the boat roll threshold value αB,threshold may be determined on the basis of the conditions of the environment surrounding the boat. As a non-limiting example, in harsh environments with huge waves and/or high wind speeds, the boat roll threshold αB,threshold may be set to a larger value than what would be the case if the boat was operated in calm sea.

As a non-limiting example, the electronic vessel control unit 28 may use an adaptive system when determining the drive unit steering angle and a drive unit roll angle for each one of the drive units 20, 22.

To this end, the electronic vessel control unit 28 may determine a first boat roll angle and then alter at least one of the drive unit steering angle and a drive unit roll angle for at least one of the drive units 20, 22 in a first direction and thereafter determine a second boat roll angle thus obtained. As a non-limiting example, each one of the first and second boat roll angles may be determined using an inclinometer.

If the second boat roll angle is closer to the target boat roll angle than the first boat roll angle, the electronic vessel control unit 28 proceeds and alters the same parameter in the first direction.

On the other hand, if the resulting boat roll angle is further away from the target boat roll angle than the first boat roll angle, the electronic vessel control unit 28 proceeds and alters the same parameter in a direction opposite of the first direction.

The adaptive method may use the above steps, i.e. determining first and second boat roll angles and altering the parameter in the first or second direction, depending on whether or not the second boat roll angle is closer to the target boat roll angle, until the difference between the resulting boat roll angle and the target boat roll male is smaller than the boat roll threshold value. As such, the relevant parameter may be identified by an iterative procedure.

Figure 4:
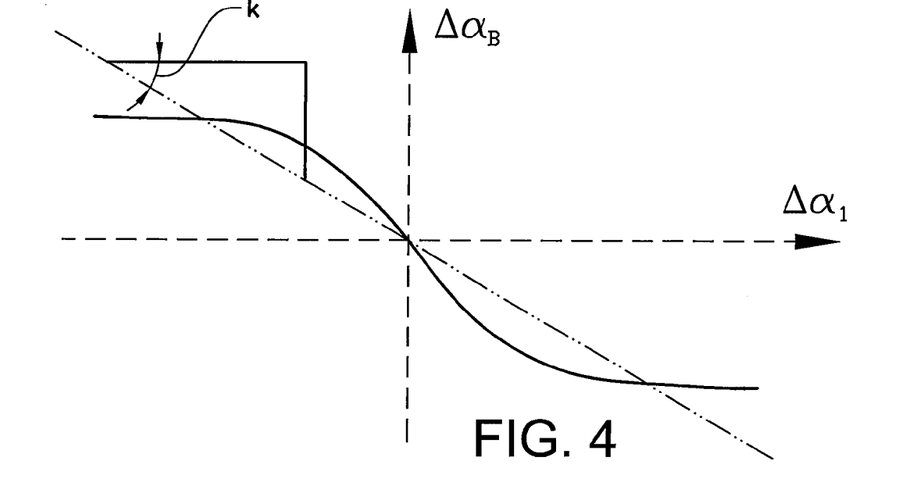
FIG. 4 illustrates examples of relations between a proposed drive unit roll angle change and a boat roll angle difference.

FIG. 4 illustrates a graph indicative of parameter, exemplified by a proposed drive unit roll angle change Δα1 as a function of the boat roll angle difference ΔαB between a resulting boat roll angle αB,result and the target boat roll angle αB,target. In FIG. 4, the drive unit roll angle ai of the first drive unit 20 is used as an example, but a similar relation could be used for each one of the drive units 20, 22 of the set 18 of drive units. As such, following the relation indicated in FIG. 4, if the boat roll angle difference ΔαB is positive, the drive unit roll angle should be increased in order to reduce the boat roll angle difference ΔαB. In a similar vein, if the if the boat roll angle difference ΔαB is negative, the drive unit roll angle ai should be reduced in order to increase the boat roll angle difference ΔαB, i.e. to reduce the absolute value of the boat roll angle difference ΔαB.

Purely by way of example, and as is indicated by the dotted line in FIG. 4, the relation between the drive unit roll angle change a^ and the roll angle difference ΔαB could be linear with a predetermined slope k. As a non-limiting example, the value of the slope k may be set in dependence of the characteristics of the hull (not shown in FIG. 4).

Generally, a large value of the slope k may result in a swift response, with large changes of the drive unit roll angle ai in response to a boat roll angle difference ΔαB. On the other hand, a small value of the slope may result in a slow response that may result in a more stable adaptive process.

Moreover, and as is indicated in FIG. 4, the relation between the drive unit roll angle change Δα1 and the roll angle difference ΔαB could also be non-linear. For instance, the relation could be progressive, i.e. represented by a function having a derivative the absolute value of which is above a derivative threshold for roll angle for differences ΔαB that are close to zero and a derivative the absolute value of which is below the derivative threshold for roll angle for differences ΔαB that are at a distance, for instance more than 2°, from zero.

It is also envisaged that the electronic vessel control unit 28 may be adapted to alter several parameters simultaneously when determining appropriate angles for each one of the drive units 20, 22.

Figure 5:
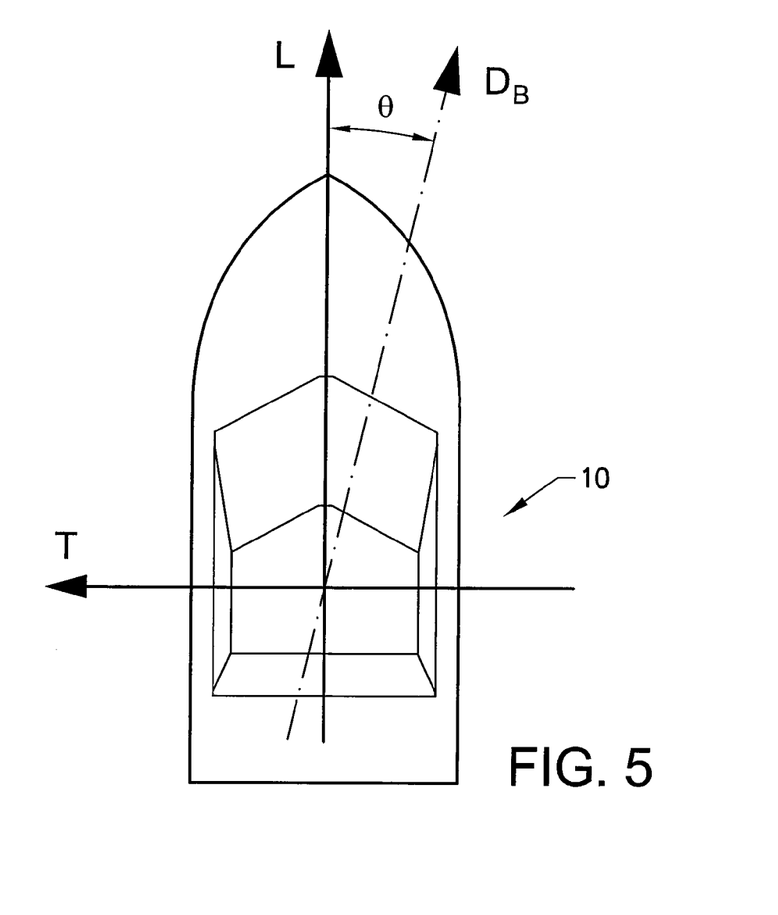
FIG. 5 illustrates a top view of the FIG. 1 boat.

FIG. 5 illustrates a top view of the FIG. 1 boat 10. FIG. 5 further illustrates that the boat 10 may assume a turning condition in which the intended boat direction of travel DB differs from the hull longitudinal axis L. The angle Θ between the intended boat direction of travel DB and the hull longitudinal axis L may be referred to as the azimuth.

Purely by way of example, the electronic vessel control unit 28 may be adapted to establish a boat direction threshold value, determine a target boat direction of travel, and positioning each drive unit in the set of drive units such that it assumes a drive unit steering angle p2 and a drive unit roll angle c^, a2 such that a resulting boat direction of travel is also obtained, the absolute value of the difference between the resulting boat direction of travel and the target boat direction of travel being smaller than a the boat direction threshold value.

Figure 6:
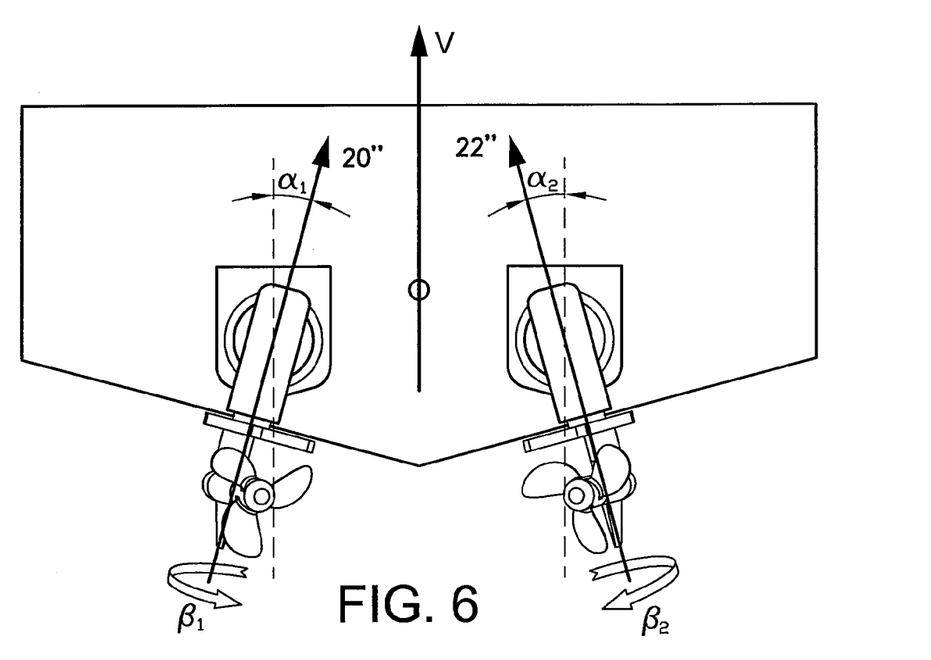
FIG. 6 illustrates a rear view of the FIG. 1 boat in a third operation condition.

As an example, FIG. 6 illustrates the FIG. 1 boat 10 in a condition wherein each one of the drive units 20, 22 is rotated around its steering axis 20", 22" such that each one of the drive units 20, 22 in the set 18 assumes a non-zero drive unit steering angle β1, β2.

Purely by way of example, the electronic vessel control unit 28 may use an adaptive system, similar to the one discussed hereinabove, when determining the drive unit steering angle 2 and a drive unit roll angle a2 for each one of the drive units 20, 22 in order to obtain an appropriate resulting boat direction of travel as well as an appropriate resulting boat roll.

Figure 7:
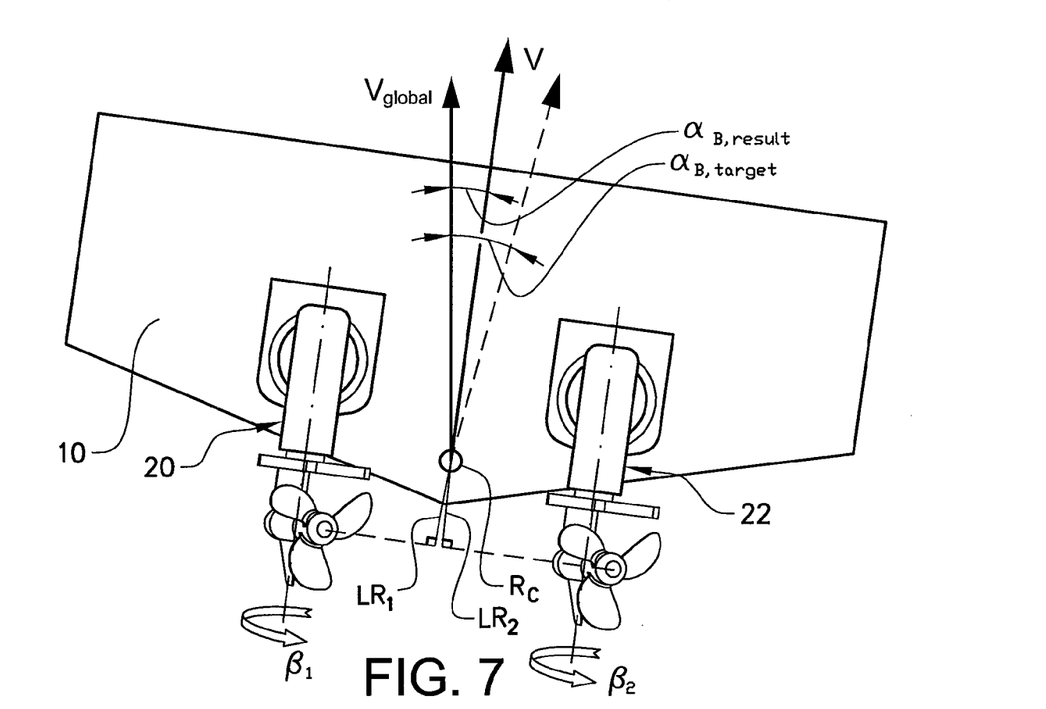
FIG. 7 illustrates a rear view of the FIG. 1 boat in a turning condition.
Figure 8:
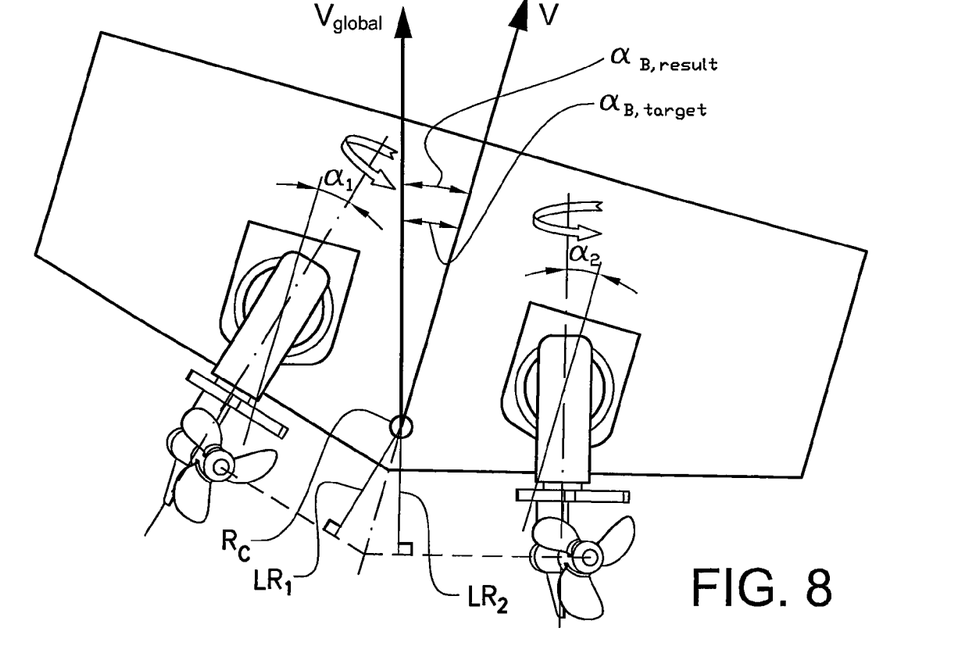
FIG. 8 illustrates a rear view of the FIG. 1 boat in the FIG. 7 turning condition with roll adjustment.

FIGS. 7 and 8 illustrate an implementation of the method for controlling a boat 10.

The FIG. 7 implementation of the boat 10 comprises two drive units 20, 22. The boat 10 is in FIG. 7 assuming a turning condition since each one of the drive unit steering angles β2 is non-zero. In fact, in the condition illustrated in FIG. 7, each one of the drive unit steering angles β2 is positive. As such, each one of the drive units 20, 22 will provide a thrust with a thrust component that is perpendicular to the hull longitudinal axis L. Such a thrust component may contribute to the turning of the boat 10.

Moreover, owing to the fact that the propeller assemblies of each one of the drive units 20, 22 are positioned at a distance from the roll centre Rc, the first drive unit 20 will be associated with a first roll lever LR^ for and the second drive unit 22 will be associated with a second roll lever LR2. Due to the combination of the thrust components and roll levers for each one of the drive units 20, 22, the boat 10 will he imparted a roll moment which will alter the roll of the boat 10. As such, in FIG. 7, the hull vertical axis V forms an axis with the global vertical axis Vgt0bai meaning that the boat 10 has a non-zero boat roll angle. Additionally, due to the shape of the hull 16, the turning as such may result in a roll of the hull. Thus, during the turning condition, the boat may assume a resulting boat roll angle αB,result.

However, the resulting boat roll angle αB,result may be different from the target boat roll angle αB,target. As has been indicated previously, the target boat roll angle αB,target may be set manually and/or automatically. The target boat roll angle αB,target is indicated in FIG. 7. In the FIG. 7 scenario, the resulting boat roll angle αB,result is smaller than the target boat roll angle αB,target.

In order to alter the roll such that the boat 10 assumes a roll position that is at least close to the target boat roll angle, the drive unit roll angle a2 of at least one of the drive units 20, 22 is altered. Since the resulting boat roll angle αB,result is smaller than the target boat roll angle in the FIG. 7 scenario, the drive unit roll angle a2 of at least one of the drive units 20, 22 may be increased.

FIG. 8 illustrates the FIG. 7 boat in a situation wherein the drive unit roll angle α1, a2 of each one of the drive units 20, 22 has been increased. As such, as compared to the condition illustrated in FIG. 7, the boat 10 has in FIG. 8 assumed a condition in which the difference between the resulting boat roll angle and the target boat roll angle is smaller than a boat roll threshold value.

Figure 9:
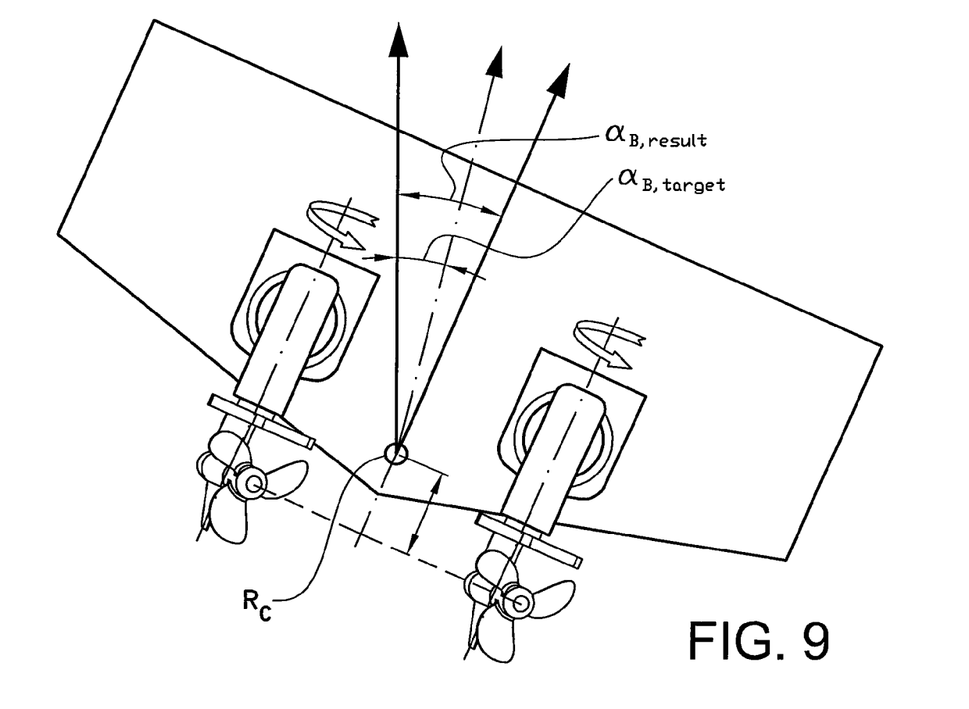
FIG. 9 illustrates a rear view of the FIG. 1 boat in another turning condition.

FIG. 9 illustrates a boat 10 in another turning condition. As compared to the FIG. 7 condition, the boat 10 in the FIG. 9 condition assumes a boat roll angle αB,result that exceeds the target boat roll angle αB,target. Thus, the boat roll angle of the boat 10 in the FIG. 9 condition needs to be reduced in order to arrive at a boat roll angle that is at least close to the target boat roll angle αB,result.

In order to alter the roll such that the boat 10 assumes a roll position that is at least close to the target boat roll angle, the drive unit roll angle Oi, a2 of at least one of the drive units 20, 22 is altered. Since the resulting boat roll angle αB,result is larger than the target boat roll angle in the FIG. 9 scenario, the drive unit roll angle may be decreased.

Figure 10:
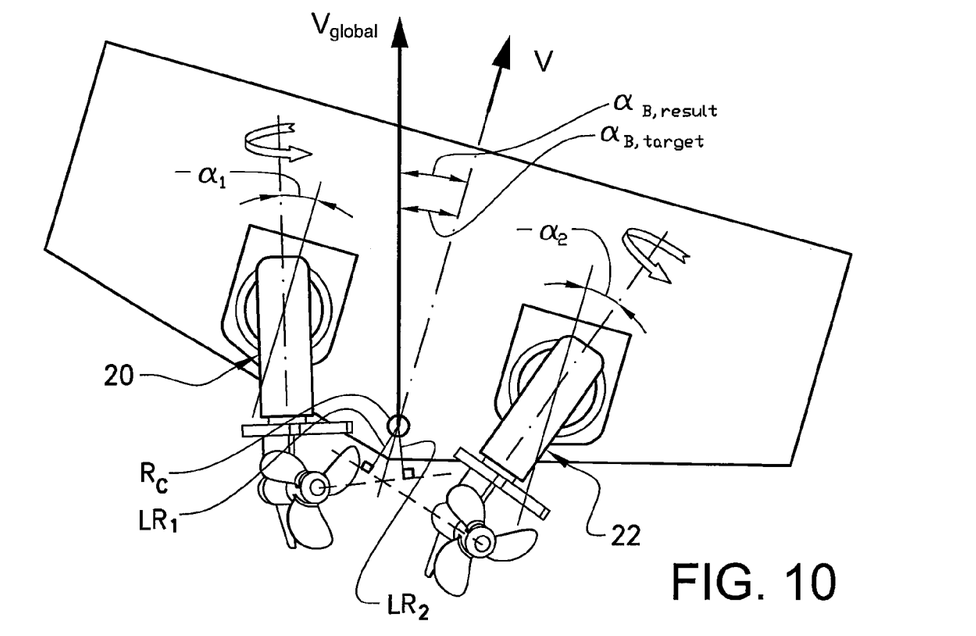
FIG. 10 illustrates a rear view of the FIG. 1 boat in the FIG. 9 turning condition with roll adjustment.

FIG. 10 illustrates the FIG. 9 boat in a situation wherein the drive unit roll angle c^, a2 of each one of the drive units 20, 22 has been decreased. As such, as compared to the condition illustrated in FIG. 9, the boat 10 has in FIG. 10 assumed a condition in which the difference between the resulting boat roll angle αB,result and the target boat roll angle aB, target is smaller than a boat roll threshold value aB,threshold FIGS. 7 to 10 illustrate embodiments of the control method wherein the roll of the boat is altered as the boat is in a turning condition. As a non-limiting example, the altering of the boat roll during a turning condition by rotating at least one of the drive units may be activated only when the operator of the boat has requested an intended boat direction of travel DB that results in an azimuth the absolute value of which exceeds a predetermined azimuth threshold value, e.g. 5°. As another non-limiting example, the altering of the boat roll during a turning condition by rotating at least one of the drive units may be activated only when the position of the steering actuator 30 is above a predetermined steering actuator threshold value. For instance, in the event that the steering actuator 30 is a steering wheel, the above altering of the boat roll may be activated only when the steering wheel is rotated more than 5° from its neutral position.

Figure 11:
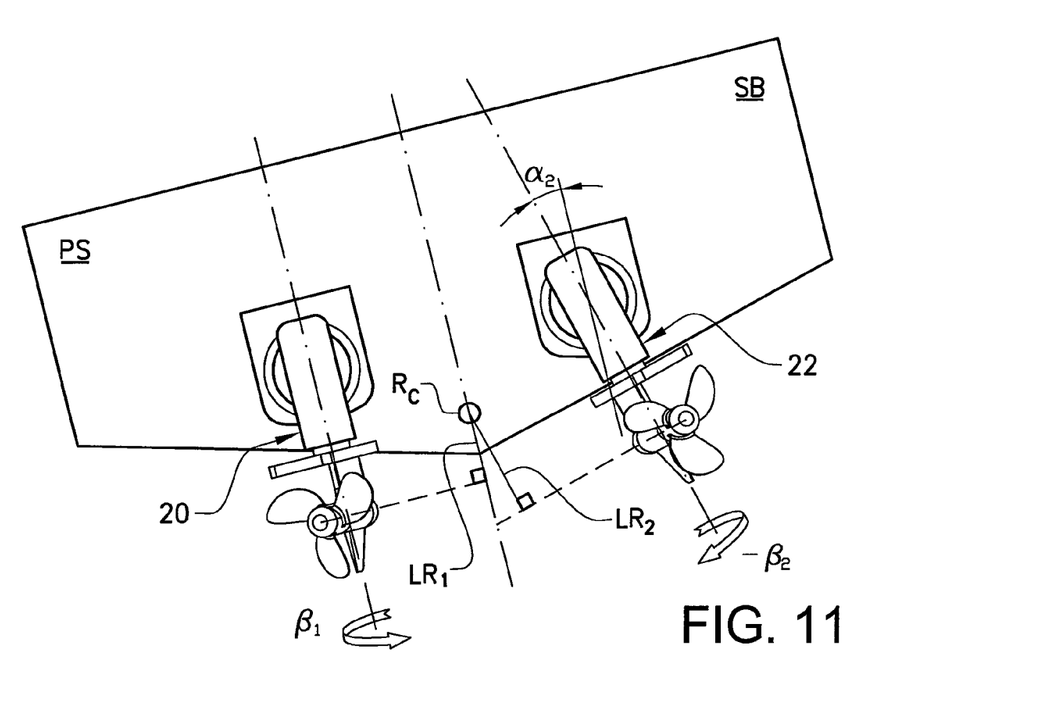
FIG. 11 illustrates a rear view of the FIG. 1 boat travelling straight ahead with roll adjustment.

However, it is also envisaged that the embodiments of the control method may alter the boat roll angle as the boat is travelling straight ahead. To this end, reference is made to FIG. 11 which illustrates a scenario in which a boat 10 travels straight ahead. Moreover, FIG. 11 illustrates the boat 10 in a condition with a negative boat roll angle, i.e. the boat 10 has an inclination, or list, towards its portside.

Such an inclination may for instance occur due to an environmental load, e.g. a wind and/or wave load, from the starboard side of the boat 10. Instead of, or in addition to, the environmental load, the inclination may be occasioned by a load condition of the boat 10 wherein the centre of gravity of the load is located towards the portside of the boat 10. Purely by way of example, the magnitude of the boat roll angle may be determined by means of an inclinometer.

In order to change the roll angle of the boat such that it assumes a new floating condition, e.g. a condition at which the boat 10 floats at substantially even keel, the drive units 20, 22 may be set so as to assume non-zero drive unit steering angles β1, β2. In the situation indicated in FIG. 10, the drive units 20, 22 assume drive unit steering angles β1, β2 indicative of that each one of the drive units 20, 22 has a propeller thrust axis that is directed forwards and also is inclined towards the centre of the boat 10.

As such, each one of the drive units 20, 22 will provide a propeller thrust with a thrust component that is perpendicular to the hull longitudinal axis L. As has been intimated hereinabove, such thrust components, in combination with the roll levers LR1, LR2, will impart a roll moment to the boat 10.

Moreover, FIG. 11 illustrates a situation in which the drive unit roll angle a2 of the second drive unit 22 is larger than the drive unit roll angle ai of the first drive unit 20. As such, the second drive unit 22 will impart a roll moment to the boat 0 that is larger than the counteracting roll moment imparted by the first drive unit 20. The difference between the roll moment imparted by the second drive unit 22 and the roll moment imparted by the first drive unit 20 will result in a total roll moment that will change the value of the boat roll angle. Moreover, the drive unit steering angles β., β2 of the first and second drive units 20, 22 are preferably selected such that the resulting thrust of the drive units 20, 22 extend in a direction that is substantially parallel to the hull longitudinal axis L.

FIGS. 7 to 11 illustrate embodiments of the control method wherein the roll of the boat is altered as the boat has a non-zero forward speed.

However, it is also envisaged that the embodiments of the control method may alter the boat roll angle when the boat is substantially stationary. To this end, reference is made to FIG. 12 which illustrates a scenario in which a boat 10 is stationary. Purely by way of example, the first and second drive units 20, 22 may have the same drive unit roll angles ¾ a2 and drive unit steering angles β1, β2 as in the FIG. 11 scenario. As has been intimated hereinabove when presenting the FIG. 11 embodiment of the control method, the first and second drive units 20, 22 may in the above-discussed condition produce a resulting thrust extending in a direction that is substantially parallel to the hull longitudinal axis L. In order to counteract such a resulting thrust, in order to maintain the boat 10 in a substantially stationary condition, one or more additional drive units 23 may be adapted to provide a thrust that has the same magnitude, but the opposite direction, as the resulting thrust provided by the first and second drive units 20, 22.

Figure 12:
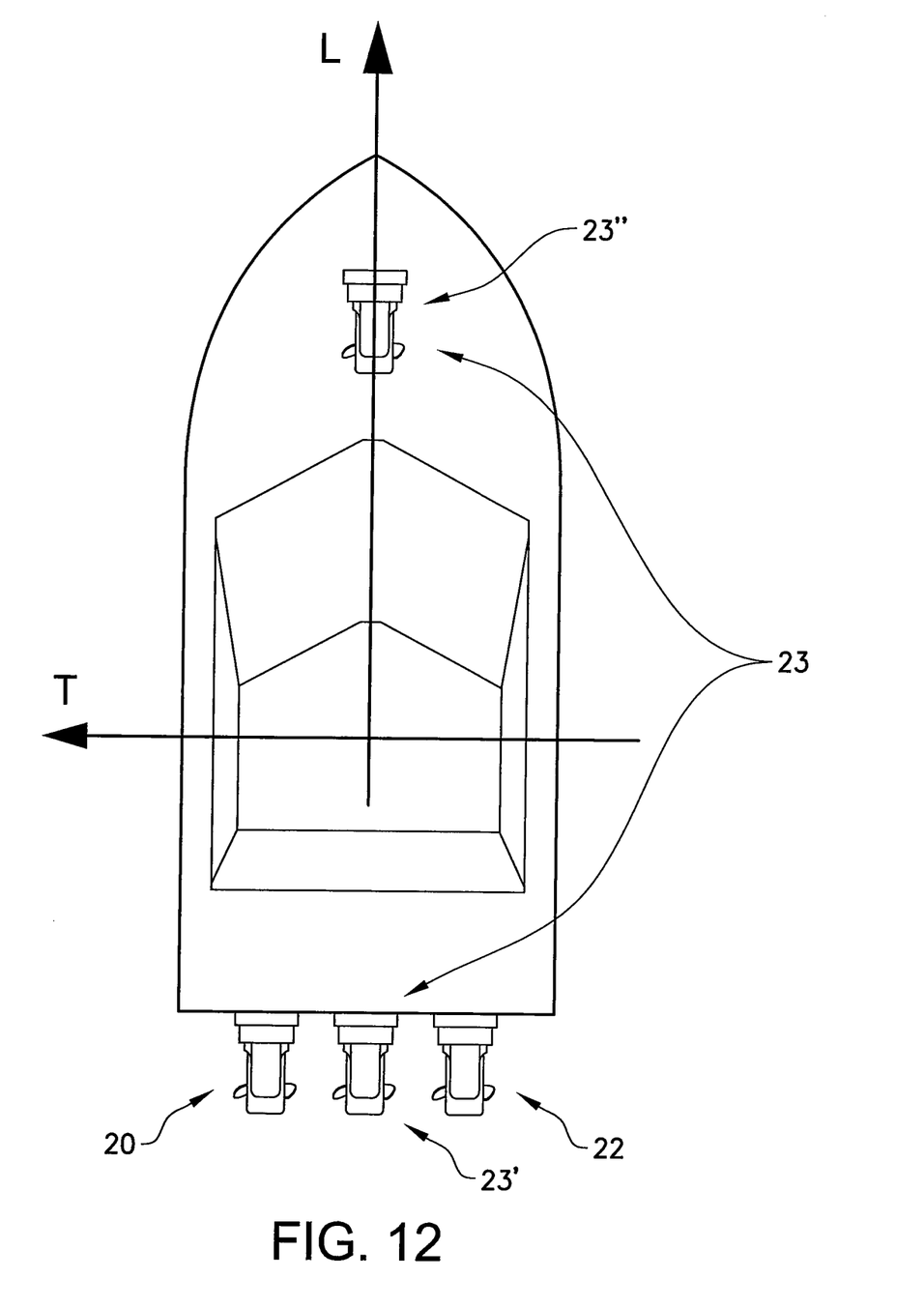
FIG. 12 illustrates a top view of a stationary boat with roll adjustment.

Purely by way of example, as indicated in FIG. 12, the one or more additional drive units 23 may comprise a drive unit 23' located at the stern of the boat 10, i.e. adjacent to the first 20 and/or the second 22 drive unit. As another non-limiting example, the one or more additional drive units 23 may comprise a drive unit 23" located at the bow of the boat 10, e.g. a so called bow thruster.

The electronic vessel control unit 28 may further be adapted to use the drive units 20, 22 for controlling the trim of the boat 10. As such, the electronic vessel control unit 28 may be adapted to implement the following method steps (be it that they do not necessarily have to be performed in the order they are presented hereinbelow):

establishing a boat trim angle threshold value;
determining a target boat trim angle, and
positioning each drive unit in the set of drive units such that it assumes a drive unit steering angle and a drive unit roll angle such that a resulting trim angle is obtained, the absolute value of the difference between the resulting trim angle and the target boat trim angle being smaller than the boat trim angle threshold value.

The boat trim angle relates to a rotation of the hull 16 around the hull lateral axis T.

Figure 13:
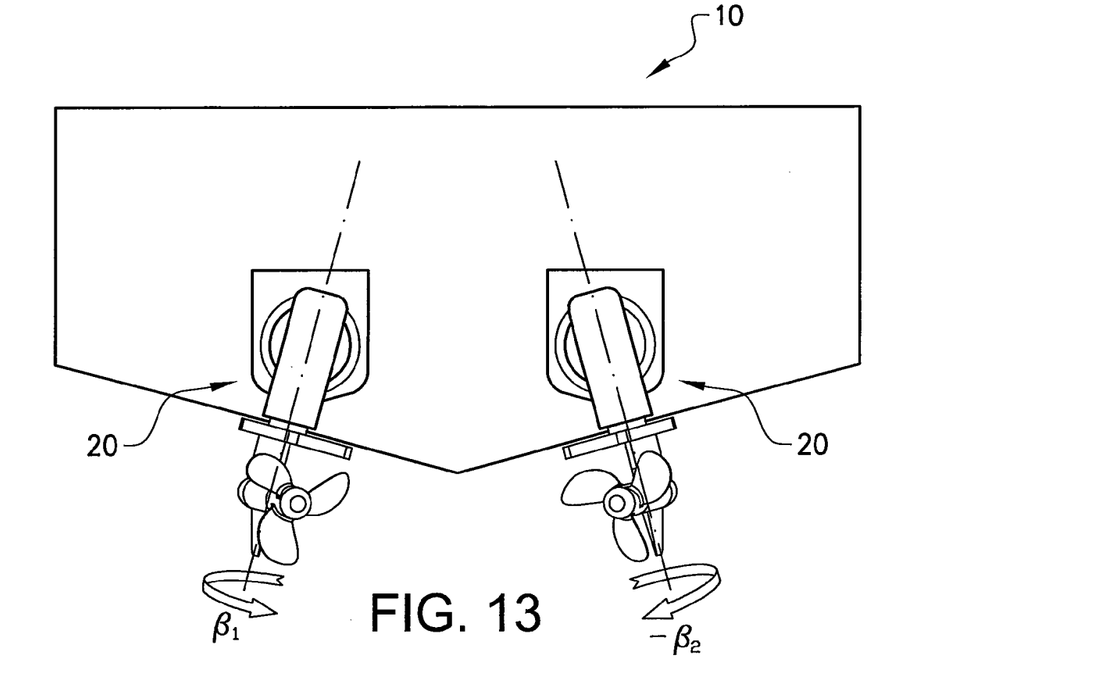
FIG. 13 illustrates a top view of the FIG. 1 boat in a sixth operation condition.

For instance, FIG. 13 illustrates the boat 10 when the drive units 20, 22 assume a so called "toe-out" condition in which the drive unit steering angles β1, β2 of the drive units 30 20, 22 are set such that the propeller axes of the drive units 20, 22 converge after the stern of the boat 16. In a "toe-out" condition, the bow (not shown in FIG. 13) of the boat generally assumes a higher position as compared to a situation in which each one of the drive units 20, 22 would assume a zero drive unit steering angle β1, β2.

Figure 14:
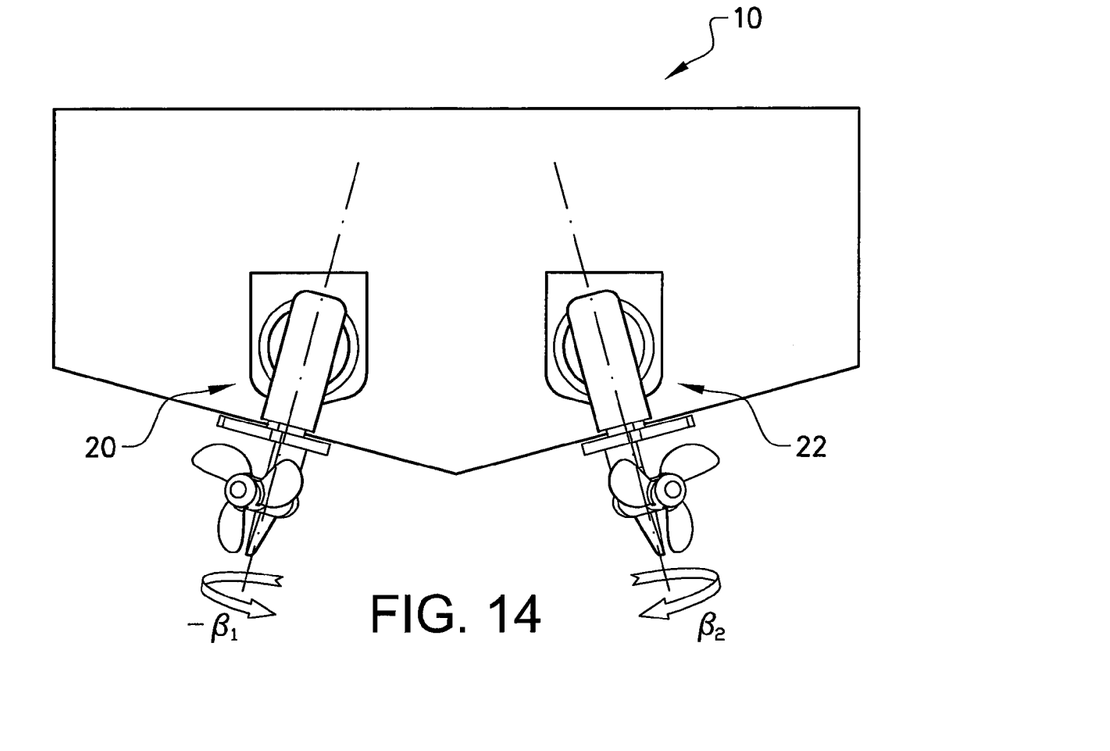
FIG. 14 illustrates a top view of the FIG. 1 boat in a seventh operation condition.
Figure 15:
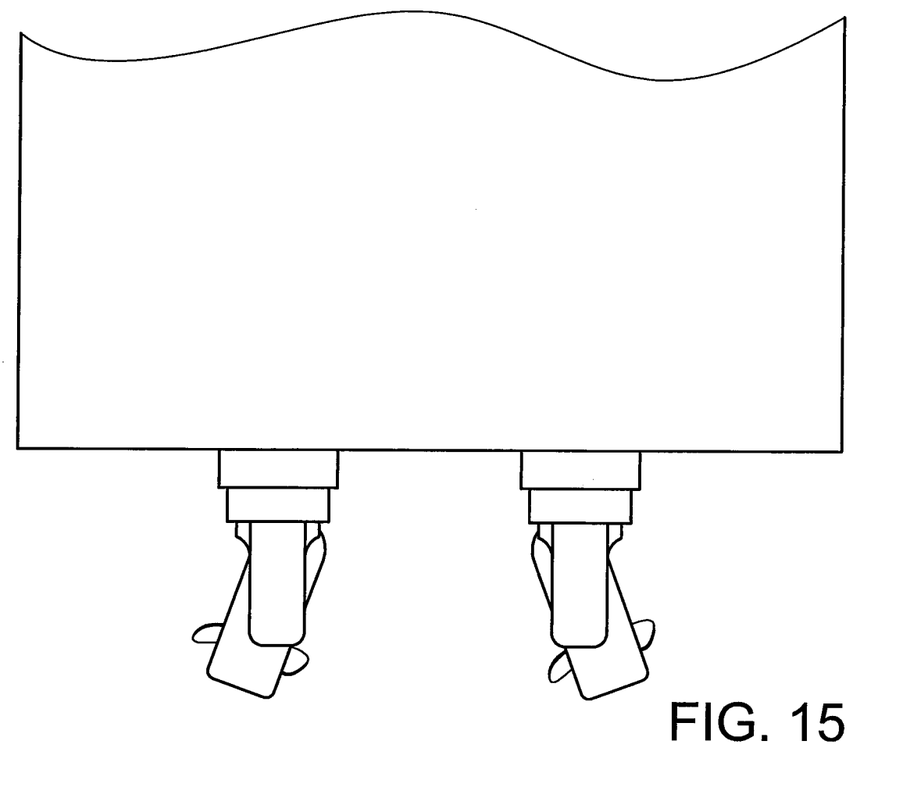
FIG. 15 illustrates a rear view of the FIG. 1 boat in the seventh operation condition.

Moreover, FIG. 14 and FIG. 15 illustrate the boat 10 when the drive units 20, 22 assume a so called "toe-in" condition in which drive unit steering angles β2 of the drive units 20, 22 are set such that the propeller axes of the drive units 20, 22 converge in front of the stern of the boat 16. In a "toe-in" condition, the bow (not shown in FIG. 14 or FIG. 15) of the boat generally assumes a lower position as compared to a situation in which each one of the drive units 20, 22 would assume a zero drive unit steering angle β1, β2.

Figure 16:
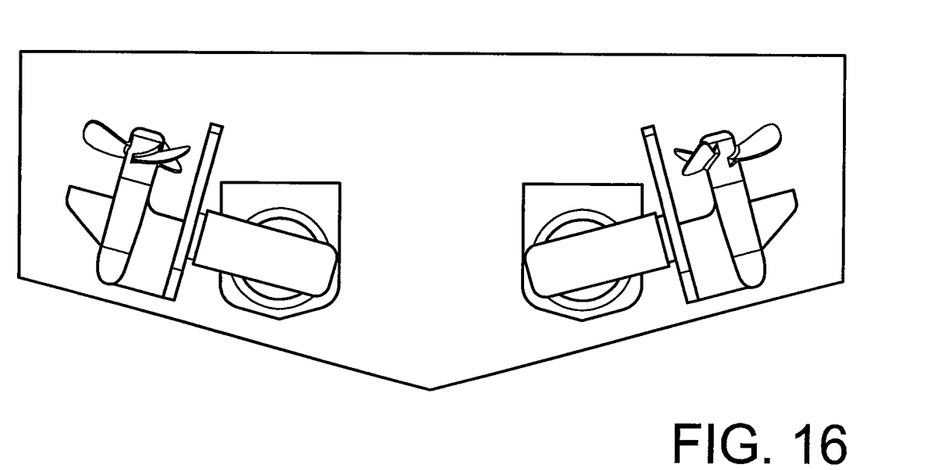
FIG. 16 illustrates a top view of the FIG. 1 boat when each one of the drive units is in a parking condition.

FIG. 16 illustrates the boat 10 when the drive units 20, 22 assume a so called parking position. When the drive units 20, 22 are in the position indicated in FIG. 9, the boat may be transported in a trailer in an appropriate manner. Moreover, if the boat 10 is kept in a body of water and the drive units 20, 22 are in the parking position indicated in FIG. 16, at least portions of the drive units 20, 22 will be located above the body of water. As such, the risk of having marine growth on at least portions of the drive units 20, 22 is reduced as compared to when the drive units 20, 22 are in a submerged condition.

Finally, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a boat, the boat being adapted to float in a body of water, the boat comprising a hull having a longitudinal extension along a hull longitudinal axis, a lateral extension along a hull lateral axis and a vertical extension along a hull vertical axis, the boat also comprising a set of drive units, the set of drive units comprising at least one drive unit, each drive unit in the set being arranged such that it, during driving of the boat, is
  adapted to be at least partially submerged into the body of water;
  adapted to be pivotable, relative to the hull, around a drive unit longitudinal axis that is substantially parallel to the hull longitudinal axis such that a drive unit roll angle can be varied, and
  adapted to be pivotable, relative to the hull, around a steering axis that forms an angle with the drive unit longitudinal axis such that a drive unit steering angle can be varied,
the method comprising:
  establishing a boat roll threshold value;
  determining a target boat roll angle, and
  positioning each drive unit in the set of drive units such that it assumes a drive unit steering angle and a drive unit roll angle such that a resulting boat roll angle is obtained, the absolute value of the difference between the resulting boat roll angle and the target boat roll angle being smaller than the boat roll threshold value.

2. The method according to claim 1, wherein the method further comprises:
  establishing a boat direction threshold value;
  determining a target boat direction of travel (DB), and
  positioning each drive unit in the set of drive units such that it assumes a drive unit steering angle and a drive unit roll angle such that a resulting boat direction of travel is also obtained, the absolute value of the difference between the resulting boat direction of travel and the target boat direction of travel being smaller than a the boat direction threshold value.

3. The method according to claim 2, wherein the method further comprises:
  determining the speed of the boat, and
  determining the target roll angle based on the target direction of travel well as the speed of the boat.

4. The method according to claim 3, wherein the target roll angle is determined using a roll angle control model that uses input comprising the following parameters: the direction of travel, the speed and selected driving characteristics.

5. The method according to claim 1, wherein the set of drive units comprises at least two drive units, the method further comprising:
  establishing a boat trim angle threshold value;
  determining a target boat trim angle, and
  positioning each drive unit in the set of drive units such that it assumes a drive unit steering angle and a drive unit roll angle such that a resulting trim angle is obtained, the absolute value of the difference between the resulting trim angle and the target boat trim angle being smaller than the boat trim angle threshold value.

6. The method according to claim 1, wherein the boat comprises steering actuator, the target boat direction of travel being determined by determining the position of the steering actuator.

7. An electronic vessel control unit for steering a boat, the boat being adapted to float in a body of water, the boat comprising a hull having a longitudinal extension along a hull longitudinal axis, a lateral extension along a hull lateral axis and a vertical extension along a hull vertical axis, the boat also comprising a set of drive units, the set of drive units comprising at least one drive unit, each drive unit in the set being arranged such that it, during driving of the boat, is
  adapted to be at least partially submerged into the body of water;
  adapted to be pivotable, relative to the hull, around a drive unit longitudinal axis that is substantially parallel to the hull longitudinal axis such that a drive unit roll angle can be varied, and
  adapted to be pivotable, relative to the hull, around a steering axis that forms an angle with the drive unit longitudinal axis such that a drive unit steering angle can be varied,
the electronic vessel control unit being adapted to:
  establish a boat roll threshold value;
  determine a target boat roll angle, and
  issue a control signal to each drive unit in the set of drive units, the control signal being indicative of a drive unit steering angle and a drive unit roll angle such that a resulting boat roll angle is obtained, the absolute value of the difference between the resulting boat roll angle and the target boat roll angle being smaller than the boat roll threshold value.

* * * * *